US008966225B2

(12) United States Patent
Oishi

(10) Patent No.: US 8,966,225 B2
(45) Date of Patent: Feb. 24, 2015

(54) REDUCING NUMBER OF PROCESSING UNITS GENERATING CALCULATION RESULT WHEN COMMUNICATION TIME TO ANOTHER NODE TAKES LONGER THAN CALCULATION TIME

(75) Inventor: Yusuke Oishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 574 days.

(21) Appl. No.: 13/343,782

(22) Filed: Jan. 5, 2012

(65) Prior Publication Data

US 2012/0210097 A1 Aug. 16, 2012

(30) Foreign Application Priority Data

Feb. 14, 2011 (JP) .................. 2011-029207

(51) Int. Cl.
G06F 15/80 (2006.01)
G06F 9/50 (2006.01)
G06F 9/54 (2006.01)
(52) U.S. Cl.
CPC ............ *G06F 9/5066* (2013.01); *G06F 9/5044* (2013.01); *G06F 9/54* (2013.01)
USPC .............................................. 712/30; 712/17
(58) Field of Classification Search
None
See application file for complete search history.

(56) References Cited

U.S. PATENT DOCUMENTS 7,370,328 B2 * 5/2008 Yamada et al. ............... 718/105
8,544,009 B2 9/2013 Shimizu et al.

FOREIGN PATENT DOCUMENTS

| JP | 05-088912 A | 4/1993 |
| JP | 06-059939 A | 3/1994 |
| JP | 8-249294 A | 9/1996 |
| JP | 2006-053835 A | 2/2006 |
| JP | 2009-169757 A | 7/2009 |
| JP | 2011-180680 A | 9/2011 |

OTHER PUBLICATIONS

Japanese Office Action mailed Jun. 10, 2014 for corresponding Japanese Office Action No. 2011-029207, with Partial English Translation, 13 pages.
Kimura, Yasunori et al., "Server Architecture: MUSCAT, Fujitsu," "Architecture Evaluation Toll for Server Machines: MUSCAT", Fujitsu Ltd., vol. 50, No. 4, Jul. 9, 1999, pp. 202-209, with English Abstract.
Goumas, Georgios et al., "Overlapping Communication and Communication in SMT Clusters with Commodity Interconnects," Cluster Computing and Workshops, IEEE International Conference, Aug. 31, 2009, pp. 1-10, XP031547966.

(Continued)

*Primary Examiner* — Kenneth Kim
(74) *Attorney, Agent, or Firm* — Fujitsu Patent Center

(57) ABSTRACT

A management unit causes a plurality of processing units to execute a calculation process. A determining unit determines whether a communication time for a communication process of exchanging a calculation result obtained from the calculation process is longer than a calculation time for the calculation process, the communication process being executed between a first computational node including the processor and a second computational node being a different computational node from the first computational node. A control unit limits number of processing units when the determining unit has determined that the communication time is longer than the calculation time.

8 Claims, 12 Drawing Sheets

(56) References Cited

OTHER PUBLICATIONS

Moore, Samuel K., "Multicore is Bad News for Supercomputers," Internet citation, Nov. 2008, Retrieved from the Internet: URL:http://www.spectrum.ieee.org/nov08/6912, [retrieved on Apr. 29, 2013], 3 pages.

Mohammad, Rashti J. et al., "Assessing the Ability of Computation/Communication Overlap and Communication Progress in Modern Interconnects," High-Performance Interconnects, 15$^{th}$ Annual IEEE Symposium, Aug. 22, 2007, pp. 117-124.

Extended European Search Report dated May 14, 2013 for corresponding European Application No. 11194949.1.

* cited by examiner

FIG.4

⟶ TIME AXIS (a) CASE WHERE CALCULATION AND COMMUNICATIONS ARE EXECUTED SIMULTANEOUSLY

| calculation |
| communication |

(b) CASE WHERE COMMUNICATIONS ARE EXECUTED AFTER CALCULATION

| calculation | communication |

FIG.5

(a) PROGRAM FOR EXECUTING CALCULATION AND COMMUNICATIONS SIMULTANEOUSLY

```
⋮
call communication_start
!OMP PARALLEL DO
call calculation
!OMP END PARALLEL DO
call communication_wait
⋮
```

(b) EXAMPLE WHERE COMMUNICATIONS ARE EXECUTED AFTER EXECUTION OF CALCULATION

```
⋮
!OMP PARALLEL DO
call calculation
!OMP END PARALLEL DO
call communication_start
call communication_wait
⋮
```

(OTHER-THAN-OVERLAPPED PORTION)
call communication_start
call omp_set_num_threads(x)
!OMP PARALLEL DO
call calculation
!OMP END PARALLEL DO
call communication_wait
(OTHER-THAN-OVERLAPPED PORTION)

REDUCING NUMBER OF PROCESSING UNITS GENERATING CALCULATION RESULT WHEN COMMUNICATION TIME TO ANOTHER NODE TAKES LONGER THAN CALCULATION TIME

CROSS-REFERENCE TO RELATED APPLICATION

This application is based upon and claims the benefit of priority of the prior Japanese Patent Application No. 2011-029207, filed on Feb. 14, 2011, the entire contents of which are incorporated herein by reference.

FIELD

The embodiments discussed herein are directed to a processor, a computational node, a parallel computer system, an arithmetic processing method, and a computer-readable storage medium.

BACKGROUND

Parallel computer systems that distribute a calculation process to multiple computational nodes or multiple processor cores for parallel execution of the calculation process have conventionally been used.

Techniques for evaluating the number of such parallel calculations and efficiency thereof have been known. As an example of the techniques, there is a known technique which runs a simulator based on an execution result (trace) of a user program, determines a calculation time and a communication time, and evaluates the number of processors. The technique is directed to a parallel computer including a plurality of processors and operating on message communications. There is also a known technique that executes a process on a per-instruction-cycle basis by processor emulation, measures an execution status at a hardware level and an accessing-state time for each of communication paths, and evaluates system efficiency. There is also a known technique that obtains information about processing speeds of processors.

Related-art examples are discussed in Japanese Laid-open Patent Publication No. 06-59939, Japanese Laid-open Patent Publication No. 05-88912, and Japanese Laid-open Patent Publication No. 2006-53835.

Some parallel computers attempt speedup by executing calculation and communications in parallel, or, put another way, by causing calculation and communications to overlap. When calculation and communications are overlapped in this manner, memory accesses for calculation and communications may bottleneck processing speed. In other words, there is a problem that performance is degraded by conflict resulting from simultaneous execution of the calculation and communications.

SUMMARY

According to an aspect of an embodiment of the invention, a processor includes a plurality of processing units; a management unit that causes the plurality of processing units to execute a calculation process; a determining unit that determines whether a communication time for a communication process of exchanging a calculation result obtained from the calculation process is longer than a calculation time for the calculation process, the communication process being executed between a first computational node including the processor and a second computational node being a different computational node from the first computational node; and a control unit that limits number of the processing units when the determining unit has determined that the communication time is longer than the calculation time.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is an explanatory diagram of speedup yielded by simultaneous execution of calculation and communications;

FIG. 5 is an explanatory diagram of a computer program for simultaneous execution (overlap execution) of calculation and communications on multiple cores;

DESCRIPTION OF EMBODIMENTS

Preferred embodiments of the present invention will be explained with reference to accompanying drawings.

Figure 1:
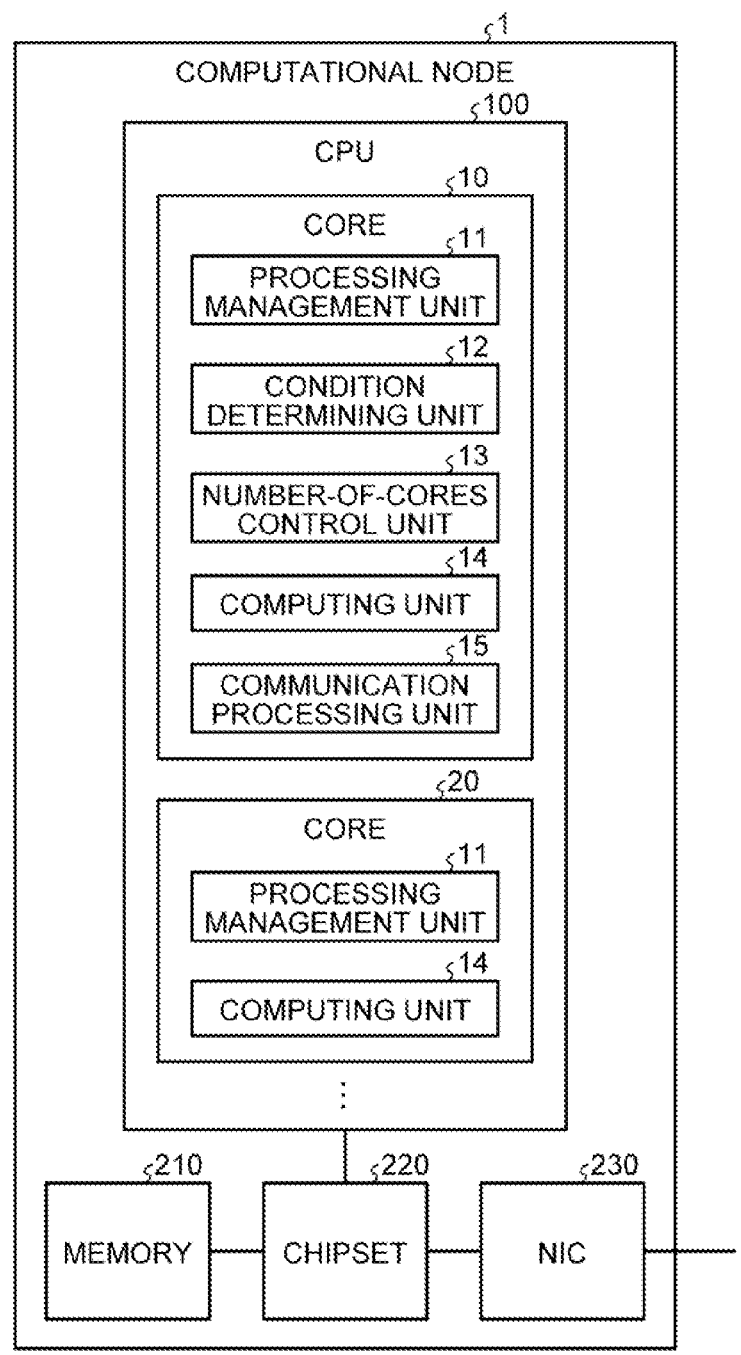
FIG. 1 is a functional block diagram of a computational node, which is an information processing apparatus according to an embodiment of the present invention.

FIG. 1 is a functional block diagram illustrating a relationship between relevant hardware components of a computational node 1, which is an information processing apparatus according to an embodiment of the present invention, and software components. The computational node 1 illustrated in FIG. 1 is configured to include a central processing unit (CPU) 100, which is a processor, memory 210, and a network interface card (NIC) 230 that are connected to a chipset 220 that includes a memory controller.

The CPU 100 includes multiple processor cores including a core 10 and a core 20. The core 10 is a master processor core of the CPU 100. A processing management unit 11, a condition determining unit 12, a number-of-cores control unit 13, a computing unit 14, and a communication processing unit 15 implemented in the core 10 perform operations described below. The processing management unit 11 divides and distributes a calculation process to its own core and other core(s), and causes the calculation process to be executed by them. The condition determining unit 12 determines whether a communication time to be consumed by the multiple processor cores to exchange calculation results is longer than a calculation time to be consumed by the multiple processor cores to execute the calculation process. The condition determining unit 12 can also make determinations including calculation of an optimum number of the processor cores at an early time of program execution, determination of number of the processor cores to be used by comparing a time to be consumed by a maximum number of the processor cores and to execute calculation and communications in parallel a time to be consumed by a limited number of the processor cores to execute the calculation and communications in parallel, and determination as to whether memory access measured with a hardware counter during parallel execution of the calculation and communications by the maximum number of the processor cores is equal to or greater than a predetermined percent of memory performance. When, as a result of the determination, it is determined that the communication time to be consumed by the multiple processor cores to exchange the calculation results is longer than the calculation time to be consumed to execute the calculation process, the number-of-cores control unit 13 limits the number of the processor cores, to which the calculation process is to be distributed.

The computing unit 14 is a processing unit that executes a calculation process portion assigned to its own core by the processing management unit 11 (core 10). The communication processing unit 15 is a processing unit that communicates with other computational node(s) to exchange data involved in the calculation process and calculation results.

The core 20 is a slave processor core, to which a calculation process portion is to be assigned by the core 10. The processing management unit 11 and the computing unit 14 of the core 20 execute, using the core 20, the calculation process portion in a harmonized manner by synchronizing the calculation process portion with calculation process portions assigned to the other core 10 and other slave core(s). The processing management unit 11 and the computing unit 14 execute the calculation process portion assigned to its own core 20 by the processing management unit 11 of the core 10. The core 10 is a master. The processing management unit 11 of the core 20 is a processing unit that performs synchronization control and the like so that the calculation process is executed by its own core 20 and the other core 10 in a harmonized manner. The computing unit 14 of the core 20 is a processing unit that executes the calculation process portion assigned to its own core 20 by the processing management unit 11 of the master core 10. The processing management unit 11 of the core 20 performs control so that the calculation process portion assigned to its own core 20 is executed in synchronization with the calculation process portions of the other core 10 and other slave core(s) in a harmonized manner. Meanwhile, the slave core has been described by way of an example of the core 20; however, any desired number of slave cores can be provided.

Figure 2:
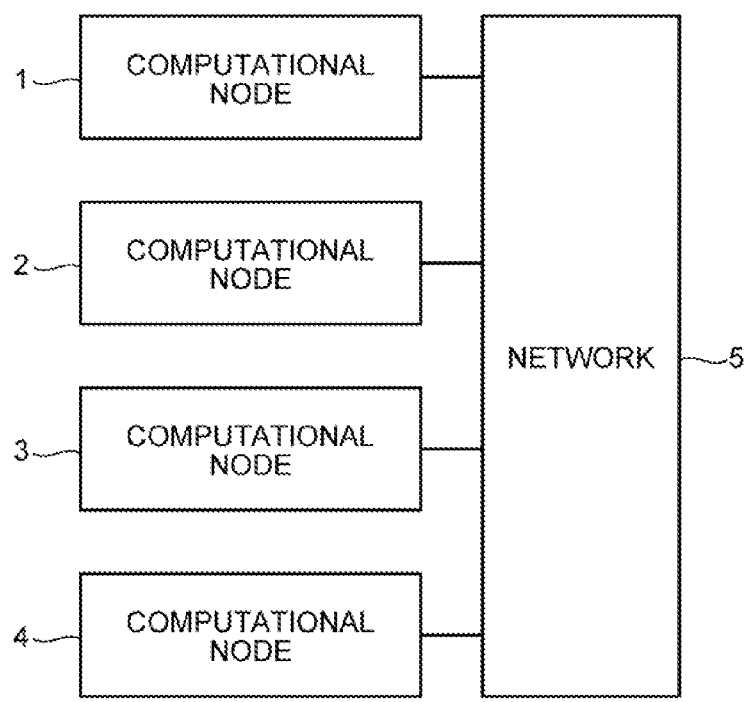
FIG. 2 is an explanatory diagram of a parallel computer system.

As illustrated in FIG. 2, the computational node 1 and computational nodes 2 to 4 are connected to one another over a high-speed network 5 via switches or the like to form a parallel computer system. The computational nodes 2 to 4 are similar to the computational node 1 in configuration.

Figure 3:
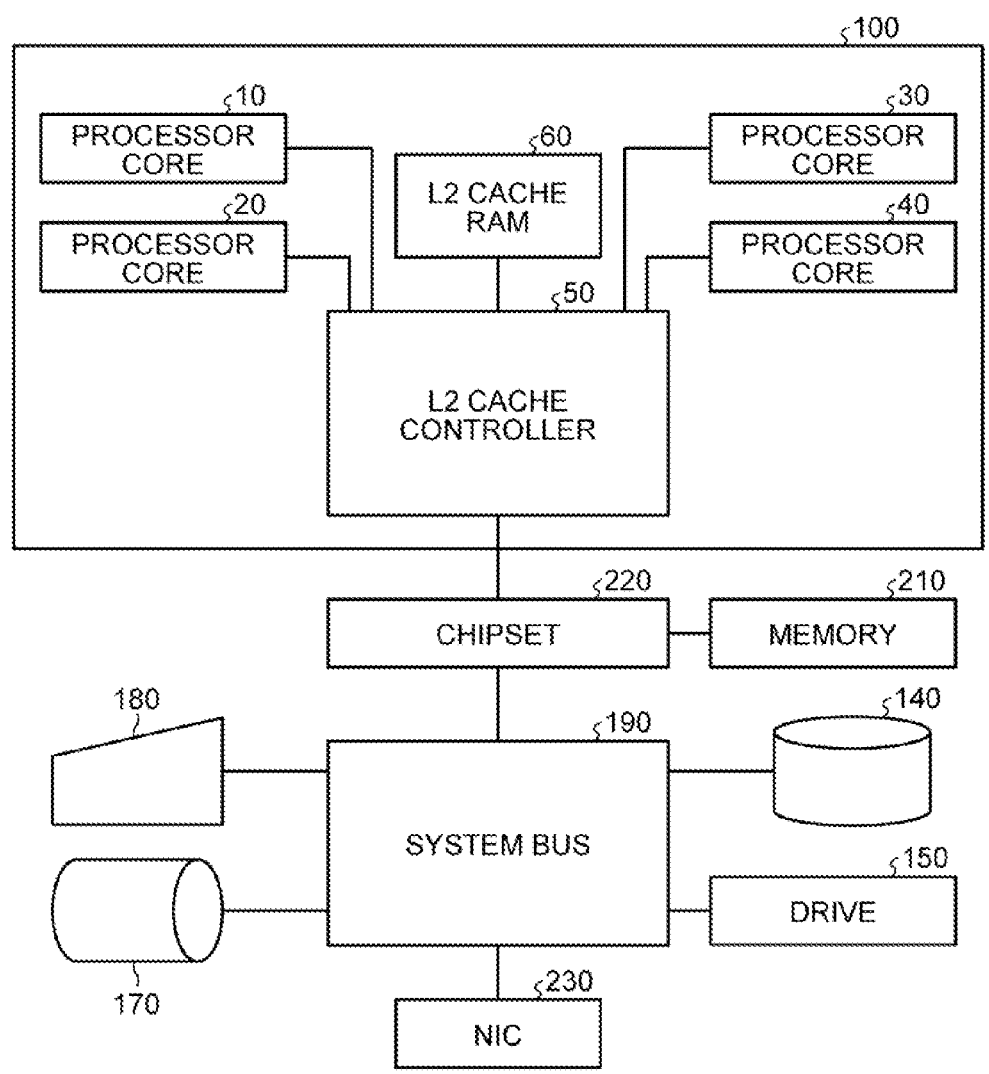
FIG. 3 is a hardware configuration diagram of the computational node.

FIG. 3 is a hardware configuration diagram that includes a detailed internal configuration of the CPU 100, which a multi-core processor, of the computational node. The CPU 100 includes four processor cores, or, more specifically, the core 10, the core 20, a core 30, and a core 40. The CPU 100 further includes a level2 (L2) cache controller 50 and L2 cache random access memory (RAM) 60.

The CPU 100 connects the memory 210 to a system bus 190 via the chipset 220. The system bus 190 is further connected to the NIC 230, a drive 150, an auxiliary storage device 140, direct access memory 170, an operation input 180, and the like. In the present embodiment, the NIC 230 is configured to be connected via the system bus to the chipset 220; however, the present embodiment is not limited thereto. For example, the system bus 190 may not be involved, and the NIC 230 may be directly connected to the chipset 220.

The computational node illustrated in FIG. 1 executes process parallelism calculation by causing the communication processing unit 15 to assign a calculation process portions by using a message passing interface (MPI) or the like. The computational node executes thread parallelism calculation by causing the processing management unit 11 to assign calculation threads to the processor cores in the CPU illustrated in FIG. 3 by using OpenMP or the like (the processing management unit 11). Exploiting process parallelism and thread parallelism simultaneously in this way is called as hybrid parallelism in some cases.

Basically, an approximately same number as the number of the processor cores that execute the threads is set as the number of threads when exploiting thread parallelism because performance is desirably maximized. For a CPU that includes a simultaneous multithreading (SMT) feature, a number that is several times greater than the number of the processor cores is assigned as the number of threads in some cases.

A problem inherent in parallel computing on a parallel computer is that communications for exchanging data between computational nodes can cause a delay. When a communication delay becomes dominant, an effect to be yielded by increasing the number of the computational nodes is not obtained, making it impossible to attain high-speed calculation.

Meanwhile, NICs that are universally used in recent years have a direct memory access (DMA) transfer feature and therefore advantageously place a relatively small load on a CPU when carrying out communications. Accordingly, it is possible to hide the communication delay by executing a calculation process by a CPU and communications via an NIC simultaneously by using the DMA transfer feature.

FIG. 4 is an explanatory diagram of speedup to be attained by simultaneous execution of calculation and communications. As illustrated in FIG. 4, simultaneous execution of calculation and communications advantageously consumes shorter time than that consumed when communications are executed after calculation.

Of FIG. 5, (a) is an explanatory diagram of a computer program for simultaneous execution (overlap execution) of calculation and communications on multiple cores. In this example, communications start at "communication_start", while "communication_wait" waits for completion of the communications. Calculation is executed by OpenMP thread parallelism in a manner to cause the calculation to overlap the communication.

"!OMP PARALLEL DO" means a start of parallelization (parallel region: a program region to be executed by multi-threading) in OpenMP, while "!OMP END PARALLEL DO" means an end of parallelization in OpenMP.

A computer program for simultaneous execution of calculation and communications on multiple cores causes, as in the case illustrated in FIG. 4 where calculation and communications are executed simultaneously, overlap execution of the calculation and communications is performed. In contrast, according to a computer program illustrated in (b) of FIG. 5 that executes communications after execution of calculation, overlap execution of calculation and communications is not performed as in the case illustrated in FIG. 4 where communications are executed after calculation.

Examples of an approach for hiding communication delay caused by simultaneous execution of calculation and communications include a speedup approach by simultaneously executing calculation and communications by using fast Fourier transform (FFT).

Described below are definitions of $Vm$, $Vc$, $V$, $Ve$, $Vn$, and $Vne$. Note that it is assumed that calculation on a multicore CPU is executed using all the cores.

$Vm$ (bytes/sec): a maximum access rate of accesses to the memory from at least any one of the NIC and the CPU. $Vm$ depends on a specification of the computer system.

$Vc$ (bytes/sec): a maximum access rate of accesses from the CPU to the memory. $Vc$ depends on the specification of the computer system and the number of cores used in the CPU. $Vc \leq Vm$ always holds.

$V$ (bytes/sec): an access rate of accesses, required by processes in the CPU, from the CPU to the memory.

$Ve$ (bytes/sec): an actual access rate of accesses to the memory from the CPU. When $Vc \geq Vm$ holds, $Ve$ is determined by performance according to the specification of the computer system and does not depend on processes in the CPU. When no communication is executed simultaneously, $Ve$ is saturated at $Ve=Vc$. $Ve \leq Vc$ always holds.

$Vn$ (bytes/sec): a maximum communication rate of communications between NICs of different two computational nodes. $Vn$ depends on the specification of the computer system. The NIC transmits data to an NIC of another node at the rate of $Vn$. Accordingly, the NIC is to access the memory at the rate of $Vn$. $Vn \leq Vm$ always holds. $Vne$ (bytes/sec): an actual communication rate of communications between the NICs of the different two computational nodes. $Vne \leq Vn$ always holds.

Figure 6:
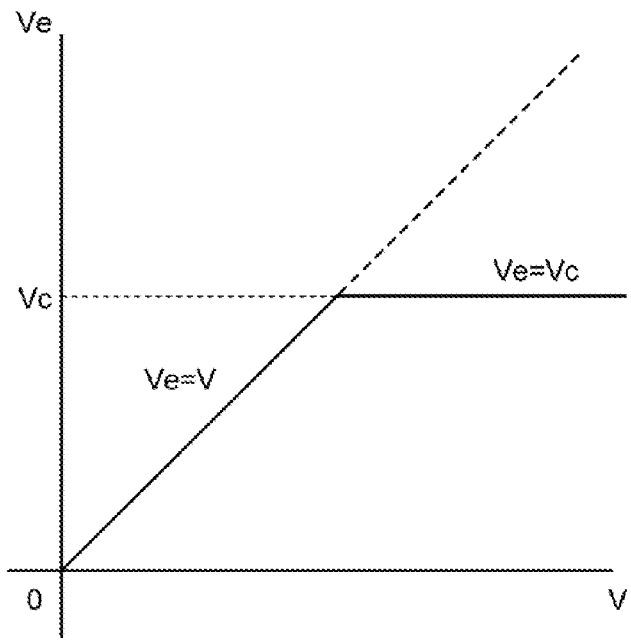
FIG. 6 is an explanatory diagram of a relationship between V, and Ve and Vc in a situation where communications are not executed (Vn=0)

FIG. 6 is an explanatory diagram of a relationship between $V$, and $Ve$ and $Vc$ in a state where communications are not carried out ($Vn=0$). As illustrated in FIG. 6, $V$, $Ve$, and $Vc$ satisfy the following equations.

$$Ve = V (V \leq Vc)$$

$$Ve = Vc (V > Vc)$$

Figure 7:
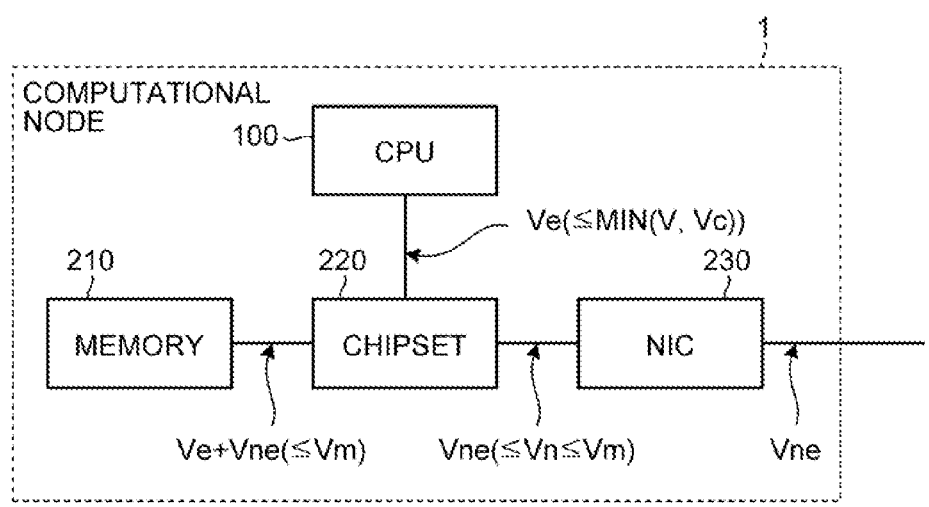
FIG. 7 is a diagram illustrating for which portion in a computational node each of Vm, Vc, V, Ve, Vn, and Vne is used to denote a velocity at the portion.

FIG. 7 is a diagram illustrating for which portion in a computational node each of $Vm$, $Vc$, $V$, $Ve$, $Vn$, and $Vne$ is used to denote a velocity at the portion.

To perform simultaneous execution of calculation and communications, memory access is to be made for each of the calculation and communications. During the simultaneous execution, an access bus between the chipset including the memory controller and the memory is to be shared. Thus, an access rate to the memory during simultaneous execution of calculation and communications is $Ve+Vn$ ($\leq Vm$).

If $V$ is sufficiently small to satisfy $V+Vn \leq Vm$, there is little interference between memory access for calculation and memory access for communication, and hence the calculation and the communications are simultaneously executed at a rate of $Ve=V$ and a rate of $Vne=Vn$, respectively.

Figure 8:
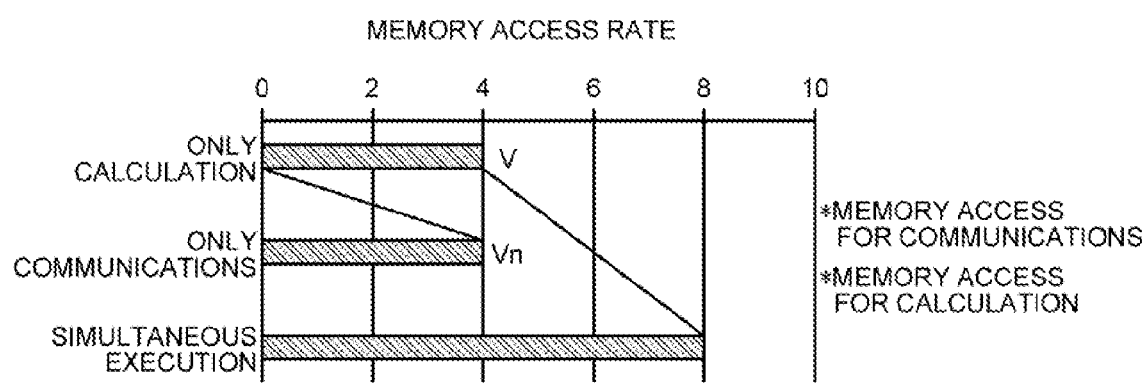
FIG. 8 is an explanatory diagram of memory accesses rates.

FIG. 8 is an explanatory diagram of memory accesses rates. FIG. 8 illustrates an example of, in a circumstance where $V+Vn \leq Vm$ holds, a memory access rate of a case where only calculation is executed, a memory access rate of a case where only communications are executed, and a memory access rate of a case where calculation and communications are executed simultaneously.

If $V$ is large to satisfy $V+Vn>Vm$, $V$ and $Vn$ decrease to satisfy $Ve<V$ and $Vne<Vn$, respectively, because of resource shortage. Furthermore, performance degradation caused by conflict resulting from the simultaneous execution occurs. Accordingly, an overall transfer rate also decreases, causing $Ve+Vne<Vm$ to hold in some cases.

Figure 9:
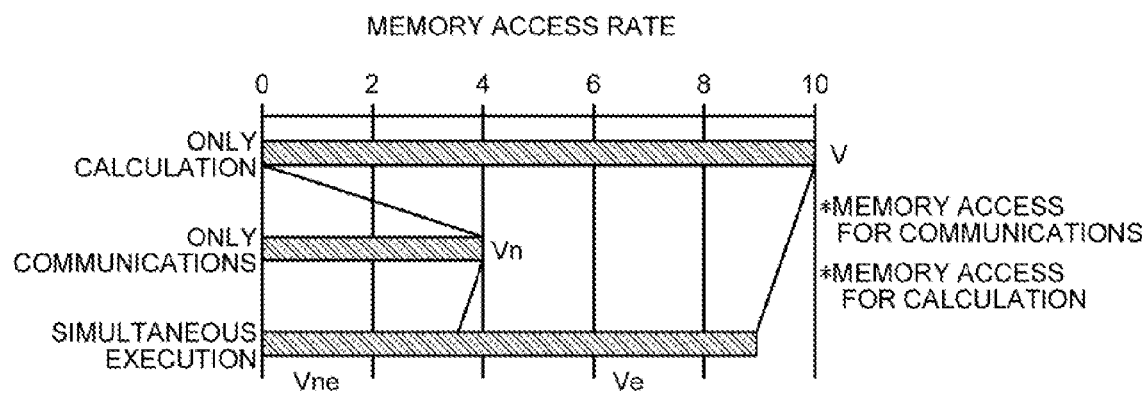
FIG. 9 is an explanatory diagram of memory access rates of a case where V+Vn>Vm holds.

FIG. 9 illustrates memory access rates of a case where $V+Vn>Vm$ holds. In FIG. 9, $Vm$ is assumed as 10. This performance degradation lessens an effect on speedup yielded by the simultaneous execution of calculation and communications.

For instance, when data of $Sn$ bytes is exchanged in communications between NICs of the nodes while memory accesses of $S$ bytes are made for calculation, $T$ seconds, which is an elapsed time, is approximately same as any longer one of $S/V$ seconds, which is a memory access time for the calculation, and $Sn/Vn$ seconds, which is a memory access time for the communications, in a case where $V+Vn \leq Vm$ holds. Put another way, an equation (1) below holds.

$$T = \mathrm{MAX}(S/V, Sn/Vn) \quad (1)$$

In contrast, in a case where $V+Vn>Vm$ holds, first, simultaneous execution of calculation and communications is completed in $\mathrm{MIN}(S/Ve, Sn/Vne)$. Thereafter, remaining data of any one of $S-VeSn/Vne$ bytes and $Sn-VneS/Ve$ bytes that has not been transmitted in a period of the simultaneous execution is transmitted. Accordingly, $T$, a total elapsed time, is obtained from equation (3) or (4) below.

$$\begin{aligned} T &= Sn/Vne + (S - VeSn/Vne)/V \\ &= Sn/Vne + S/V - (Ve/V)Sn/Vne \\ &= S/V + (1 - Ve/V)Sn/Vne (S/Ve > Sn/Vne) \end{aligned} \quad (3)$$

$$\begin{aligned} T &= S/Ve + (Sn - VneS/Ve)/Vn \\ &= S/Ve + Sn/Vn - (Vne/Vn)S/Ve \\ &= Sn/Vn + (1 - Vne/Vn)S/Ve (S/Ve < Sn/Vne) \end{aligned} \quad (4)$$

Thus, the total elapsed time becomes longer than that of the equation (1) by $(1-Ve/V)Sn/Vne$ seconds or by $(1-Vne/Vn)S/Ve$ seconds depending on $Ve$ or $Vne$.

In a circumstance where $V+Vn>Vm$ holds at which transfer performance degrades, by bringing $Ve(\leq Vc(x))$, which is the memory access rate for calculation, into a circumstance where $Ve+Vn \leq Vm$ holds at which the transfer performance does not degrade by intentionally reducing $x$, which is the number of the cores to be used, performance degradation that would otherwise be caused by conflict of memory accesses can be avoided.

Meanwhile, it is not generally easy to control $Vne$. Described below is an approach of controlling $Ve$ by changing $x$, the number of the cores be used, thereby changing $Vc(x)$ ($\geq Ve$), which is a maximum value of $Ve$. This approach is disadvantageous in that, reducing $Ve$ in a situation where S/Ve>Sn/Vne holds (i.e., calculation time is longer than communication time) elongates total processing time. In view of this, a situation where S/Ve<Sn/Vne holds (i.e., communication time is longer than calculation time) is preferably targeted.

Any benchmark can be employed as a benchmark for measuring Vc(x), which is the maximum memory access rate for calculation by the system. Examples of the benchmark include a STREAM benchmark. Presented below is a relationship Vc(x) between x, the numbers of cores to be used by a server that includes two 4-core CPUs (8 cores per server), and memory access rates obtained by measurement.

| x (number of cores to be used) | Vc(x) (memory access rate) (Mbytes/sec) |
| --- | --- |
| 1 | up to 3700 |
| 2 | up to 5500 |
| 4 | up to 6200 |
| 8 | up to 6200 |

When the number of cores to be used is small, the memory access rate is, not only in the system described above but generally, small and Vc(x)≤Vc(x+1) (1≤x≤N_core) holds. Meanwhile, Vc(N_core) (in the illustrated system, N_core=8) is equal to Vm because all memory buses in the system are used and no communication is executed.

Approximately 1,200 megabytes/sec of Vn, the memory access rate for communications (=communication rate), is obtained by measurement using a predetermined benchmark.

By making use of the relationship between the numbers of cores and the memory access rates, it is possible to adjust Ve(≤Vc(x)), which is the memory access rate for calculation, by decreasing the number of the processor cores to be used in calculation.

However, it is noted that reducing the number of cores excessively can make calculation time longer than communication time, causing processing time to become long rather than short in total.

More specifically, it is desirable that Vc(N_core) is changed to appropriate Vc(x) so as to satisfy a conditional inequality (5) below to avoid conflict of memory accesses, and simultaneously satisfy a conditional inequality (6) below that expresses a condition that processing time with the limited number of the processor cores is shorter than processing time with a not-yet-limited number of the same. When (5) is satisfied and V(x)>Vc(x) holds, Ve=Vc(x) holds. When V(x)<Vc(x) holds, Ve=V(x) holds.

$$Vc(x)+Vn \leq Vm \quad (5)$$

$$\mathrm{MAX}(S/Vc(x), Sn/Vn) \leq Sn/Vn+(1-Vne/Vn)S/Ve \quad (6)$$

An embodiment of the present invention is based on the concept described above. According to the embodiment, the condition determining unit 12 determines whether the system is in a circumstance where V+Vn>Vm holds and transfer performance is degraded by conflict of memory access. When the condition determining unit 12 has determined that the system is in the circumstance where V+Vn>Vm holds, the number-of-cores control unit 13 limits the number of the cores, to which a calculation process to be distributed, thereby avoiding performance degradation. Furthermore, according to the embodiment, the condition determining unit 12 determines x, which is an optimum number of the cores to avoid such a circumstance, based on the inequalities (5) and (6). The number-of-cores control unit 13 performs control so that the calculation process is distributed to the x cores. Meanwhile, the number of cores to be used is changed by adjusting the number of threads to be assigned to each core. Examples of a method for adjusting the number of threads by using, for instance, the processing management unit 11 that is based on OpenMP include a method of using the omp_set_num_threads function in a computer program.

Figures 10, 11:
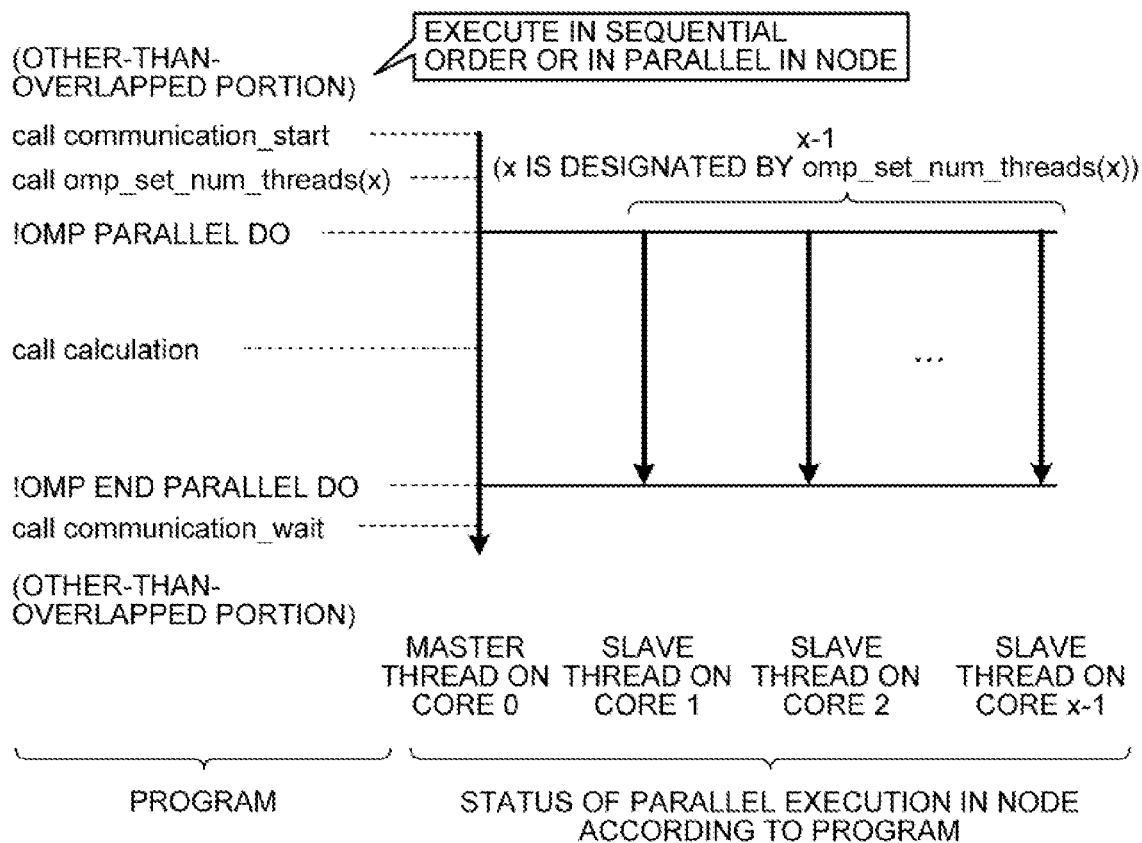
FIG. 10 is an explanatory diagram of a code for performing overlap execution of calculation and communications while adjusting the number of threads.
FIG. 11 is an explanatory diagram of operations of cores in one node.

FIG. 10 illustrates an example code for overlap execution of calculation and communications while adjusting the number of threads. In this example, an appropriate value is assigned to x by omp_set_num_threads.

FIG. 11 illustrates operations of CPUs that are executing the code illustrated in FIG. 10. The communication instructions "communication_start" and "communication_wait" that correspond to calls by the communication processing unit 15 and "omp_set_num_threads(x)" that corresponds to a call by the number-of-cores control unit 13 are executed by a core 0 (e.g., the core 10), to which the master thread is assigned. Thereafter, a calculation process in the parallel region (between "!OMP PARALLEL DO" and "!OMP PARALLEL") is distributed by the processing management unit 11 to x cores (from the core 0 to a core x−1) designated by the "omp_set_num_threads" function and executed in parallel by the computing unit 14 of each core.

Although FIG. 11 illustrates the operations of the cores in one node, when processes are to be executed in parallel on multiple nodes by using an MPI and/or the like, the cores operate in each node as in FIG. 11.

Methods that can be taken by the condition determining unit 12 to find x, which is the number of the cores to be used, that satisfies the inequalities (5) and (6) include the following three methods.

Zeroth Method

For each of 1 to N_core, which is the number of executable threads (in the case of SMT, several times N_core instead of N_core), T_over(x), an elapsed time, is measured by executing a to-be-overlapped portion of the thread(s). One of the numbers of threads that yields a shortest elapsed time is to be adopted.

However, this method is undesirable because overhead required for execution of a not-optimum number(s) of the threads to search for the optimum number of threads becomes large. In particular, overhead of a many-core CPU, such as a 16-core CPU or a 32-core CPU, is large.

In view of this, methods for avoiding wasteful search and determining an optimum number of the cores by simple measurement based on a criterion are a first method and a second method.

First Method

When an inequality (7) below is satisfied, the inequality (6) holds.

$$S/Vc(x) \leq Sn/Vn \quad (7)$$

This is because obtained from $$\leftrightarrow \mathrm{MAX}(S/Vc(x), Sn/Vn)=Sn/Vn \quad (7)$$

is $$\leftrightarrow Sn/Vn \leq Sn/Vn+(1-Vne/Vn)S/Ve \leftrightarrow 0 \leq (1-Vne/Vn)$$
$$S/Ve \leftrightarrow Vne \leq Vn. \quad (6)$$

Accordingly, x that satisfies, instead of (6), the inequality (7), both sides of which can be obtained by measurement easily, is determined. In actuality, even when x does not satisfies (7) and Sn/Vn<S/Vc(x) holds, insofar as x satisfies the following inequality, (6) is satisfied.

$$(Sn/Vn<)S/Vc(x) \leq Sn/Vn+(1-Vne/Vn)S/Ve$$

However, in this method, as a determination condition, the inequality (7) that allows determining by simple measurement is used instead of the inequality (6) although the inequality (7) imposes a restriction on the condition. Put another way, a condition that a code, in which the number of the cores is optimized, be executed faster than a code, in which the number of cores is not optimized yet, is replaced with a condition that a calculation time by a reduced number of the cores in a case where calculation and communications are not overlapped be equal to or shorter than a communication time in the case where the calculation and communications are not overlapped.

In this method, the following definitions are set forth.

T_comm=Sn/Vn
T_calc=S/Vc(N_core)

Both of T_comm and T_calc can be obtained by measurement. Subsequently, the following definitions are set forth.

$$Rc(x)=Vc(N\_core)/Vc(x)$$

By using these definitions, (7) can be rewritten as follows.

$$\leftrightarrow S/Vc(x) \leq Sn/Vn \quad (7)$$

$$\leftrightarrow Rc(x)T\_calc \leq T\_comm \leftrightarrow Rc(x) \leq T\_comm/T\_calc \quad (8)$$

To satisfy (5), Vc(N_core)≤Vm is to be satisfied. Accordingly, if a following inequality (9) is satisfied, (5) is to be satisfied.

$$Vc(x)+Vn \leq Vc(N\_core) \quad (5)$$

$$\leftrightarrow Vc(x) \leq Vc(N\_core)-Vn \quad (9)$$

The above can be put another way as follows.
(I) First, the relationship described above between the numbers of the cores and the memory access rates is obtained by measurement in advance, and a table that contains pairs of Vc(x) and Rc(x) is created.
(II) Subsequently, the code illustrated in FIG. 5 for executing communications after execution of calculation is executed to measure T_calc and T_comm, which are a time to be consumed for calculation and a time to be consumed for communications when calculation and communications are executed by N_core without being overlapped, respectively, and T_comm/T_calc is calculated.
(III) Thereafter, a maximum value of x that causes the inequality (8), Rc(x)≤T_comm/T_calc, to hold and simultaneously satisfies the inequality (9), Vc(x)≤Vc(N_core)-Vn, is calculated, and the calculated value is employed. In other words, the maximum value of x that satisfies (8) and also reduces an amount of memory to be used for communications from the calculation side is to be employed.

The reason why the maximum value of x that satisfy the inequality (8) and the inequality (9) is selected is that when the number of the cores is excessively reduced, processing speed of the CPU can become too slow, causing the processing speed of the CPU, rather than the memory access rate, to produce a bottleneck and slow down the calculation.

Figures 12, 13:
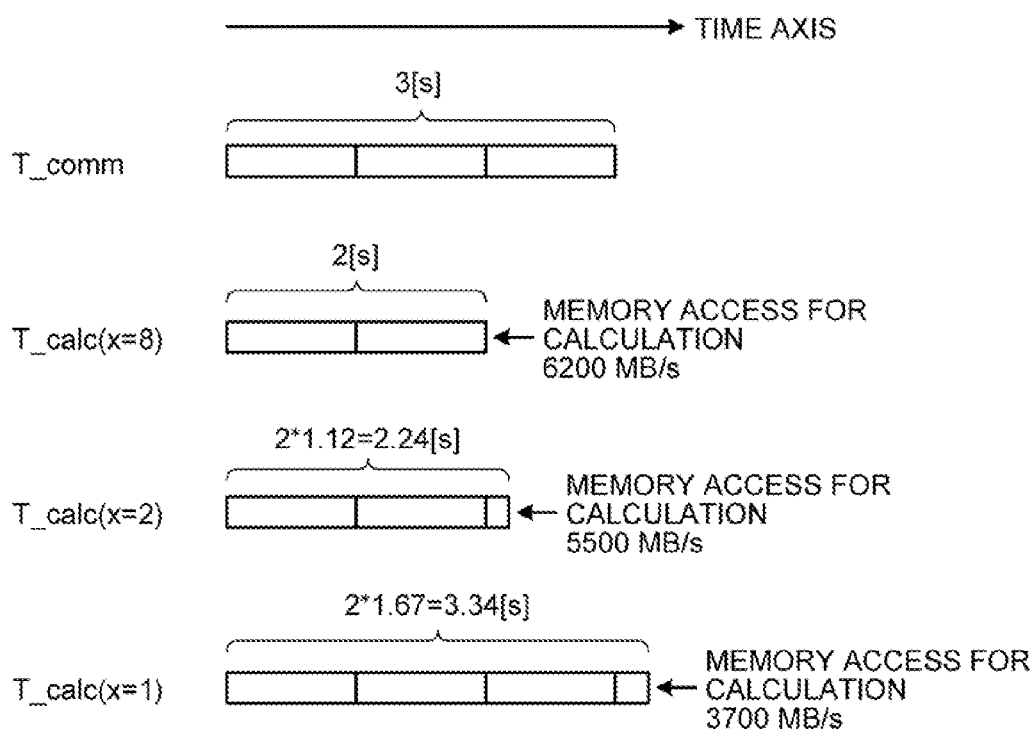
FIG. 12 is an explanatory diagram of a situation where a CPU, in which the number of the cores and the memory access rates are in the relationship described above, is used.
FIG. 13 is an explanatory diagram of a parallel calculation code.

For example, FIG. 12 illustrates an example where a CPU, in which the number of the cores and the memory access rate are in the relationship described above, is used. For a case where T_comm is 3 seconds and T_calc is 2 seconds, T_comm/T_calc=1.5 is obtained. In this case, even when calculation speed becomes 1.5 times slower, calculation is to be completed earlier than communications. Meanwhile, it is comprehended by reference to the relationship between the numbers of the cores and the memory access rates described above that reducing the number of the cores from 8 cores to 4 cores makes calculation time becomes 1 time longer (Rc(4)=1), reducing the number of the cores from 8 cores to 2 cores makes calculation time (6200/5500=)1.12 times longer (Rc(2)=1.12), and reducing the number of the cores from 8 cores to 1 core makes calculation time 1.67 times longer (Rc(1)=1.67).

In this case, the maximum value of x that satisfies Rc(x)≤1.5 is 2 because Rc(2)=1.12. Accordingly, when calculation is executed with 2 cores, it is expected that the calculation is completed before communications are completed while reducing a memory bandwidth for use in the calculation.

Most of parallel calculation codes basically repeatedly do similar operation. This holds for a time-dependent problem, for example. FIG. 13 illustrates an example of such a code. In this example, t is a variable that indicates each step of repeated operations. A same operation is repeatedly done from t=1 to t=Nt. Accordingly, the computer program can optimize itself in its environment by performing (I) before calculation starts, performing (II) for t=1, and performing (III) for t=2, ..., Nt.

It is noted that, the calculation described above targets a situation where memory accesses produce a bottleneck and performance depends only on the memory access rate. If an attempt of determining the number of the cores for calculation where memory accesses do not bottleneck by a similar method is made, the calculation can be slowed down rather than be accelerated. This is because, when the number of the cores to be used is reduced, there can be a case where calculation speed is slowed down by a farther extent than that in calculation where memory access bottlenecks. For instance, when calculation where memory accesses bottleneck is executed on a CPU, in which the number of the cores and the memory access rate are presented in the relational table described above, it is assumed that calculation time with 1 core is only 1.67 times longer than that where calculation is executed with 8 cores; however, calculation time of calculation where memory access does not bottleneck is ideally assumed to be 8 times longer.

However, it is not possible to determine whether memory access bottlenecks the calculation described above. Accordingly, it is desirable to compare a case where the calculation is executed with x=N calc and a case where the calculation is executed with x, which is determined by the method described above, and to select one of the cases that increases performance more than the other case does.

Figure 14:
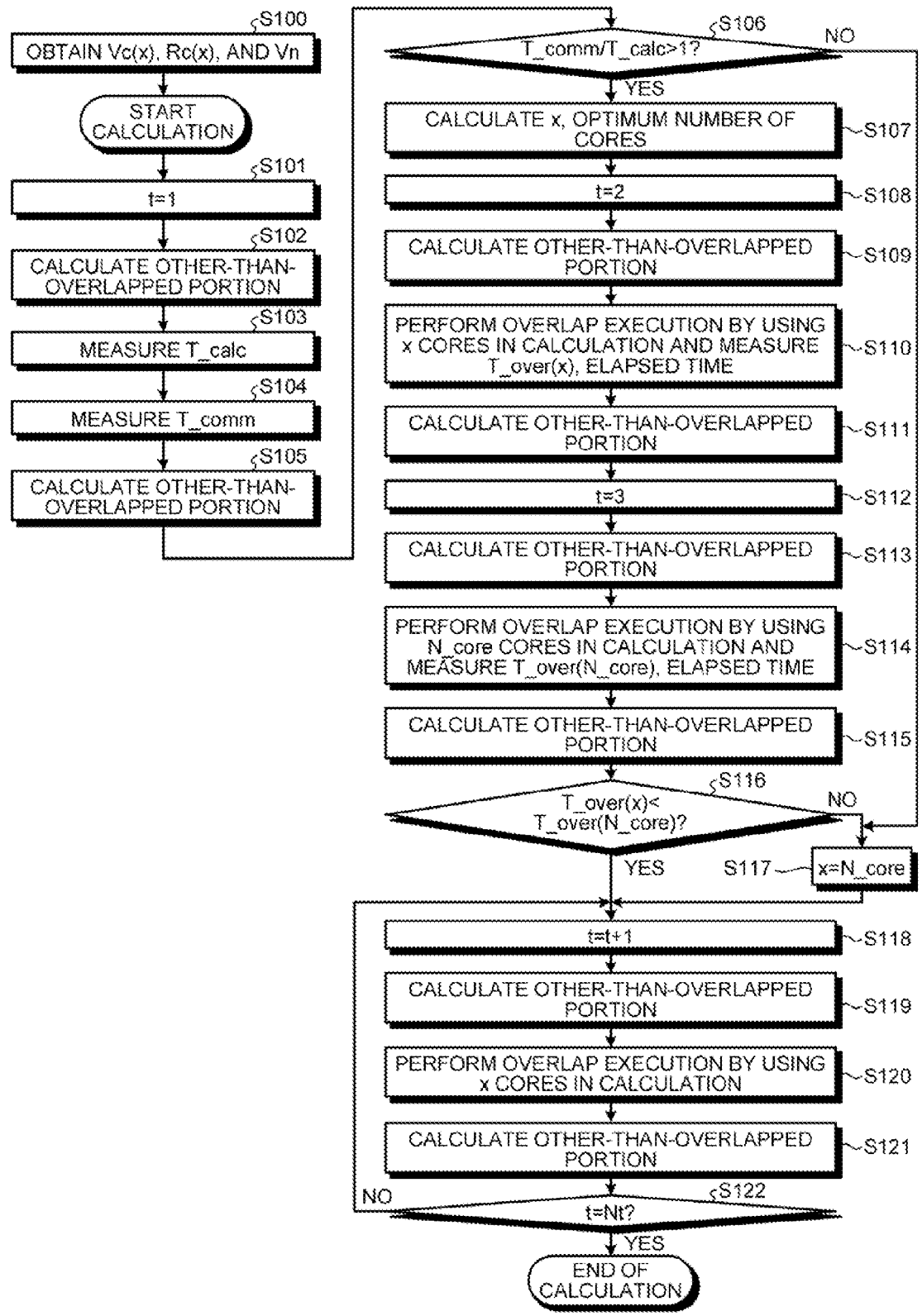
FIG. 14 is a flowchart for a first arithmetic processing method according to the embodiment.

FIG. 14 is a flowchart for the first method that takes the above into consideration. First, the master core obtains Vc(x), Rc(x), and Vn (S100) and assigns 1 to t (S101). Subsequently, the master core calculates an other-than-overlapped portion (S102). The master core obtains T_calc (S103) and T_comm (S104) by measurement.

Furthermore, the master core calculates an other-than-overlapped portion (S105) and determines whether T_comm/T_calc is greater than 1 (S106).

If T_comm/T_calc is greater than 1 (YES at S106), the master core calculates x, which is an optimum number of the cores (S107), and assigns 2 to t (S108). The master core calculates an other-than-overlapped portion (S109), performs overlap execution by using x cores in calculation, and calculates T_over(x), which is an elapsed time (5110).

Thereafter, the master core calculates an other-than-overlapped portion (5111), assigns 3 to t (S112), and further calculates an other-than-overlapped portion (S113). Thereafter, the master core performs overlap execution by using N_core in calculation and measures T_over(N_core), an elapsed time (S114). Thereafter, the master core calculates an other-than-overlapped portion (S115), and determines whether T_over(x) is smaller than T_over(N_core) (S116).

If T_comm/T_calc is equal to or smaller than 1 (NO at S106), or if T_over(x) is equal to or greater than T_over(N_core) (NO at S116), the master core assigns N_core to x (S117).

If T_over(x) is smaller than T_over(N_core) (YES at S116), or after Step S117, the master core assigns t+1 to t (S118) and calculates an other-than-overlapped portion (S119). Thereafter, the master core performs overlap execution by using x cores in calculation (S120) and calculates an other-than-overlapped portion (S121).

Thereafter, the master core determines whether t has reached Nt (S122). If t has not reached Nt yet (NO at S122), process control returns to Step S118, while if t has reached Nt (YES at S122), process control ends.

Figure 15:
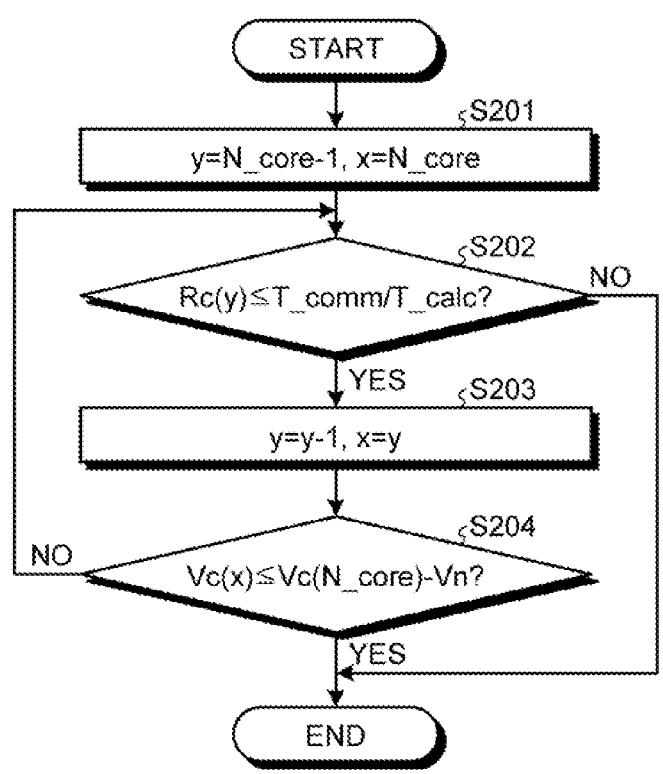
FIG. 15 is a flowchart illustrating, in detail, calculation of x, which is an optimum number of the cores.

FIG. 15 is a flowchart illustrating, in detail, calculation of x, which is the optimum number of the cores (S107) illustrated in FIG. 14. The master core assigns N_core−1 to y and N_core to x (S201) and determines whether Rc(y)≤T_comm/T_calc holds (S202).

If it is determined that Rc(y)≤T_comm/T_calc holds (YES at S202), the master core assigns y−1 to y and y to x (S203), and determines whether Vc(x)≤Vc(N_core)−Vn holds (S204). If Vc(x)≤Vc(N_core)−Vn does not hold (NO at S204), process control returns to Step S202. If it is determined that Vc(x)≤Vc(N_core)−Vn holds (YES at S204), or if Rc(y)≤T_comm/T_calc does not hold (NO at S202), process control ends.

Second Method "For case where hardware count value is available"

The first method forces to conduct a search for an optimum number of the cores to be used even for a case where performance degradation due to conflict of memory accesses does not occur; accordingly, wasteful operation is to be performed in some cases. In view of this, in the second method, an environment where a hardware count value of a CPU can be obtained is provided, and memory accesses during simultaneous execution of calculation and communications are measured based on a count value representing the number of cache misses. Only when a value related to the memory accesses is close to Vm (for example, in a range of ±10% from Vm to take performance degradation and measurement error into consideration), the first method is performed.

Figure 16:
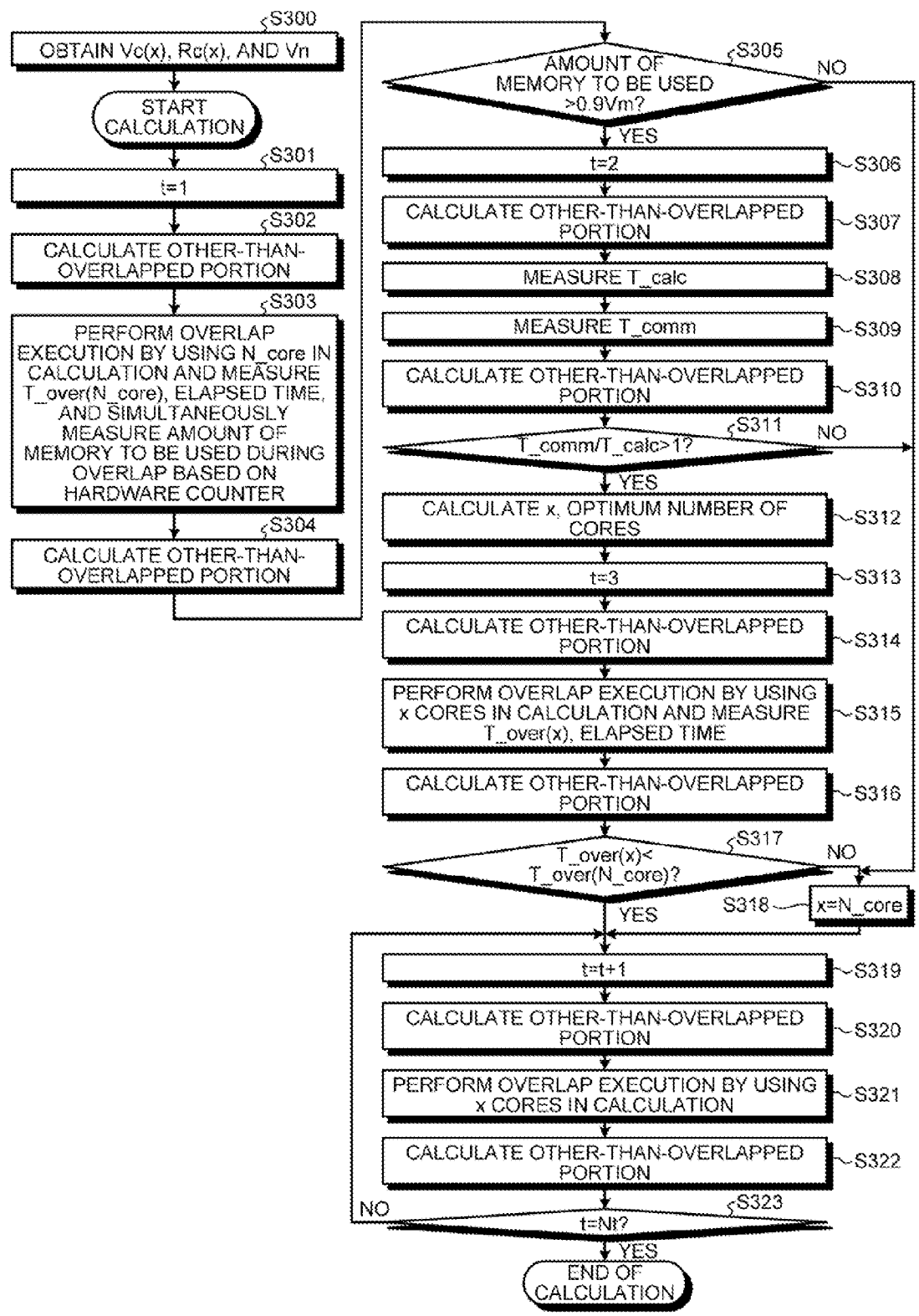
FIG. 16 is a flowchart for a second arithmetic processing method according to the embodiment.

FIG. 16 is a flowchart for the second method. The master core obtains Vc(x), Rc(x), and Vn (S300) and assigns 1 to t (S301). Subsequently, the master core calculates an other-than-overlapped portion (S302), performs overlap execution by using N_core in calculation, obtains T_over(N_core), which is an elapsed time, by measurement, and simultaneously measures an amount of memory that is used during the overlap based on the hardware counter (S303). Thereafter, the master core calculates an other-than-overlapped portion (S304). If the amount of used memory is equal to or greater than 0.9 Vm (YES at S305), the master core assigns 2 to t (S306). Thereafter, the master core calculates an other-than-overlapped portion (S307), and obtains T_calc (S308) and T_comm (S309) by measurement. Furthermore, the master core calculates an other-than-overlapped portion (S310) and determines whether T_comm/T_calc is greater than 1 (S311).

If T_comm/T_calc is greater than 1 (YES at S311), the master core calculates x, which is an optimum number of the cores (S312), and assigns 3 to t (S313). The master core then calculates an other-than-overlapped portion (S314), performs overlap execution by using x cores in calculation, and obtains T_over(x), which is an elapsed time, by measurement (S315).

Thereafter, the master core calculates an other-than-overlapped portion (S316), and determines whether T_over(x) is smaller than T_over(N_core) (S317).

If the amount of used memory is smaller than 0.9 Vm (NO at S305), if T_comm/T_calc is equal to or smaller than 1 (NO at S311), or if T_over(x) is equal to or greater than T_over(N_core) (NO at S317), the master core assigns N_core to x (S318).

If T_over(x) is smaller than T_over(N_core) (YES at S317), or after Step S318, the master core assigns t+1 to t (S319), and calculates an other-than-overlapped portion (S320). Thereafter, the master core performs overlap execution by using x cores in calculation (S321), and calculates an other-than-overlapped portion (S322).

Thereafter, the master core determines whether t has reached Nt (S323). If t has not reached Nt yet (NO at S323), process control returns to Step S319, while if t has reached Nt (YES at S323), process control ends.

With the first and second methods, the number of the cores to be used is appropriately limited and memory accesses for calculation is reduced, making it possible to prevent occurrence of the problem of performance degradation that would otherwise be caused by simultaneous execution of calculation and communications resulting from conflict of memory accesses for the calculation and memory accesses for the communications. Accordingly, application speedup can be achieved.

Figure 17:
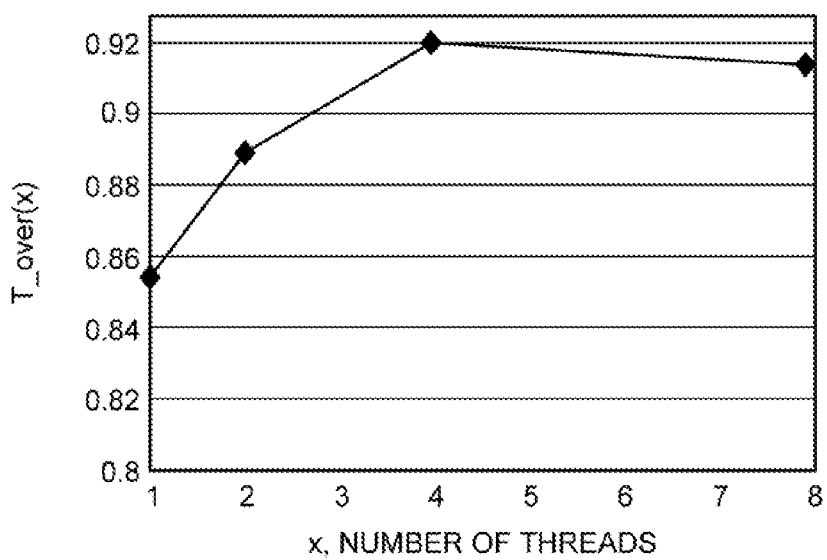
FIG. 17 is an explanatory diagram of a result of measurement of times to be consumed to simultaneously execute calculation and communications for different numbers of threads used in calculation.

FIG. 17 is an example measurement result of time to be consumed by a server to execute calculation and communications simultaneously for different numbers of threads (i.e., the number of the cores) used in calculation. T_calc, which is a calculation time, and T_comm, which is a communication time, obtained by measurement of a same case as this case but without overlap are 0.21 and 0.86, respectively. Accordingly, T_comm/T_calc=4.13 is obtained. An optimum number of the cores for this case is determined as: x=1. In this case, a result of measurement with 1 thread is faster by 0.06 second than a result of measurement with 8 threads and fastest.

According to the second method, the first method is applied only to a case where memory accesses for calculation and communications are close to a limit of memory performance provided by the system. Accordingly, a wasteful verifying operation can be avoided.

As described above, according to an aspect of the present invention, the processing management unit 11 distributes a calculation process to multiple processor cores and causes the calculation process to be executed by them. The condition determining unit 12 determines whether a communication time to be consumed by the multiple processor cores to exchange calculation results is longer than a calculation time to be consumed to execute the calculation process. When it is determined that the communication time to be consumed by the multiple processor cores to exchange the calculation results is longer than the calculation time to be consumed to execute the calculation process, the condition determining unit 12 calculates an optimum number of the processor cores, and the number-of-cores control unit 13 limits the number of the processor cores, to which the calculation process is to be distributed.

According to an aspect of the present invention, performance degradation caused by conflict resulting from simultaneous execution of calculation and communications can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processor, included in a first computational node, comprising:
   a plurality of processing units;
   a management unit that causes the plurality of processing units to execute a calculation process;
   a determining unit that determines whether a communication time for a communication process of exchanging a calculation result obtained in the calculation process is longer than a calculation time for the calculation result, the communication process being executed between the first computational node and a second computational node; and
   a control unit that limits number of the processing units when the determining unit has determined that the communication time is longer than the calculation time, the processing units whose number is limited by the control unit continuing executing the calculation process.

2. The processor according to claim 1, wherein when a calculation time for a calculation result executed by the limited number of the processing units in a situation where the calculation process and the communication process are not executed in parallel is equal to or shorter than a communication time in a situation where the calculation process and the communication process are executed in parallel, the determining unit determines whether a total time of the calculation time and the communication time executed by the limited number of the processing units is smaller than a total time of the calculation time and the communication time executed by a not-yet-limited number of the processing units.

3. The processor according to claim 2,
   the processor further comprising a table that stores a pair of number of the processing units and memory access rate, the memory access rate being an access rate of an access from the processor to a main storage device connected to the processor and storing a calculation result obtained in the calculation process executed by the processor; wherein
   the determining unit obtains a calculation time and a communication time in a situation where the calculation process and the communication process are executed in parallel by a maximum number of the processing units in the processor, and calculates number of the processing units to be used based on the obtained calculation time and the obtained communication time, and a communication time calculated from the pair of the number of the processing units and the memory access rate held in the table.

4. The processor according to claim 3, wherein the determining unit calculates the number of the processing units to be used based on a result of comparison between a time for parallel execution of the calculation process and the communication process by the maximum number of the processing units and a time for parallel execution of the calculation process and the communication process by the limited number of the processing units.

5. A parallel computer system comprising:
   a fist computational node ; and
   a second computational node, the first computational node and the second computational node being connected to each other, wherein
   the first computational node includes:
      multiple first processing units;
      a first processor that includes the multiple first processing units;
      a first management unit that causes the multiple first processing units of the first processor to execute a first calculation process;
      a first communication unit that exchanges a first calculation result obtained in the first calculation process between the first computational node and the second computational node;
      a determining unit that determines whether a first communication time for a first communication process of exchanging the first calculation result is longer than a first calculation time for the first calculation result; and
      a control unit that, when the determining unit has determined that the first communication time is longer than the first calculation time, limits number of the first processing units, the first processing units whose number is limited by the control unit continuing executing the first calculation process; and
      a first main storage device that is connected to the first processor and stores the first calculation result, and
   the second computational node includes:
      multiple second processing units;
      a second processor that includes the multiple second processing units;
      a second management unit that causes the multiple second processing units of the second processor to execute a second calculation process; and
      a second communication unit that exchanges a second calculation result obtained in the second calculation process between the first computational node and the second computational node.

6. An arithmetic processing method for an processor, the processor being provided in each of computational nodes (1 to 4) provided in a parallel computer system, the arithmetic processing method comprising:
   causing, by a computing management unit provided in the processor of one of the computational nodes (1 to 4), a plurality of processing units to execute a calculation process;
   determining, by a determining unit provided in the processor , whether a communication time for a communication process of exchanging a calculation result obtained in the calculation process is longer than a calculation time for the calculation result, the communication process being executed between the one of the computational nodes and another computational node of the computational nodes; and
   when the determining unit has determined that the communication time is longer than the calculation time, limiting, by a control unit provided in the processor, number of the processing units, to which the calculation process is to be distributed, the processing units whose number is limited by the control unit continuing executing the calculation process.

7. A non-transitory computer-readable storage medium having stored therein an arithmetic processing program for a processor provided in each of multiple computational nodes (1 to 4) provided in a parallel computer system, the arithmetic processing program causing a computer to execute a process comprising:
   causing a plurality of processing units of the processor of one of the computational nodes (1 to 4) to execute a calculation process;

determining whether a communication time for a communication process of exchanging a calculation result obtained in the calculation process is longer than a calculation time for the calculation result, the communication process being executed between the one of the computational nodes and an other computational node of the computational nodes; and when it is determined that the communication time is longer than the calculation time, limiting number of the processing units, to which the calculation process is to be distributed, the processing units whose number is limited continuing executing the calculation process.

8. An arithmetic processing apparatus, being provided in each of computational nodes (1 to 4), comprising:
   a plurality of processor cores; and
   a memory, wherein at least one of the plurality of processor cores executes:
      causing the plurality of processor cores of the arithmetic processing apparatus of one of the computational nodes (1 to 4) to execute a calculation process;
      determining whether a communication time for a communication process of exchanging a calculation result obtained in the calculation process is longer than a calculation time for the calculation result, the communication process being executed between the one of the computational nodes and an other computational node of the computational nodes; and
      limiting number of the processor cores when determining that the communication time is longer than the calculation time, the processor cores whose number is limited continuing executing the calculation process.

* * * * *